(12) United States Patent
Ahmad et al.

(10) Patent No.: US 12,164,540 B2
(45) Date of Patent: Dec. 10, 2024

(54) DEDICATED REPLICATION CHANNELS FOR REPLICATING RECORDS BETWEEN REGIONS

(71) Applicant: Oracle International Corporation, Redwood Shores, CA (US)

(72) Inventors: Arsalan Ahmad, Redmond, WA (US); Ashwin Kumar Vajantri, Seattle, WA (US); Vijay Kumar Agrawal, Redmond, WA (US); Pradyumna Reddy Vajja, Bellevue, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/088,318

(22) Filed: Nov. 3, 2020

(65) Prior Publication Data

US 2022/0138220 A1    May 5, 2022

(51) Int. Cl.
*G06F 16/27* (2019.01)
*G06F 16/23* (2019.01)

(52) U.S. Cl.
CPC .......... *G06F 16/27* (2019.01); *G06F 16/2379* (2019.01); *G06F 16/273* (2019.01); *G06F 16/275* (2019.01); *G06F 16/278* (2019.01)

(58) Field of Classification Search
CPC .... G06F 16/27; G06F 16/2379; G06F 16/275; G06F 16/273; G06F 16/278
See application file for complete search history.

(56) References Cited

U.S. PATENT DOCUMENTS

| | | | |
|---|---|---|---|
| 10,148,530 B2* | 12/2018 | Chatterjee | H04L 67/10 |
| 10,952,222 B1* | 3/2021 | Wires | H04W 72/1268 |
| 2004/0103147 A1* | 5/2004 | Flesher | G06F 16/27 |
| | | | 707/999.009 |
| 2014/0280595 A1* | 9/2014 | Mani | H04L 65/403 |
| | | | 709/204 |
| 2014/0280975 A1* | 9/2014 | Mordani | H04L 67/56 |
| | | | 709/226 |
| 2016/0337386 A1* | 11/2016 | Ford | H04L 63/1466 |
| 2018/0041336 A1* | 2/2018 | Keshava | H04L 9/0891 |
| 2019/0268149 A1* | 8/2019 | Kariv | H04L 9/0897 |
| 2019/0306138 A1* | 10/2019 | Carru | H04L 41/28 |
| 2019/0312857 A1* | 10/2019 | Lander | G06F 9/5072 |

\* cited by examiner

*Primary Examiner* — Hosain T Alam
*Assistant Examiner* — Lin Lin M Htay
(74) *Attorney, Agent, or Firm* — Kilpatrick Townsend & Stockton LLP

(57) ABSTRACT

A server can receive a request to subscribe to a data tenancy in an extended region. The server can determine a size of stored data records associated with the data tenancy in a home region to be replicated in the extended region. Based in part on the size of the stored data records, the server can open a new communication channel dedicated to replicating the stored data records from the first server in the home region to the second server in the extended region. The server can pull the stored data records from the first server in the home region, store the pulled data records on the second sever in the extended region. The server can receive updated data records over an established communication channel between the first server in the home region and the second server in the extended region and store the updated data records on the second server.

20 Claims, 8 Drawing Sheets

DEDICATED REPLICATION CHANNELS FOR REPLICATING RECORDS BETWEEN REGIONS

BACKGROUND

The demand for cloud-based services continues to increase rapidly. The term cloud service is generally used to refer to a service that is made available to users or customers on demand (e.g., via a subscription model) using systems and infrastructure (cloud infrastructure) provided by a cloud services provider. Typically, the servers and systems that make up the cloud service provider's infrastructure are separate from the customer's own on premise servers and systems. Customers can thus avail themselves of cloud services provided by a cloud service provider without having to purchase separate hardware and software resources for the services. There are various different types of cloud services including Software-as-a-Service (SaaS), Platform-as-a-Service (PaaS), Infrastructure-as-a-Service (IaaS), and others.

When a customer of a cloud service provider (CSP) subscribes to a cloud service provided by the (CSP), a tenancy or account is created for that customer. As part of the tenancy creation, computing resources (e.g., compute, memory, and networking resources) are provisioned for the customer for providing the cloud service subscribed to by the customer. These provisioned computing resources are from cloud service provider infrastructure (CSPI) provided by the CSP. The account is created for a particular region referred to as the "home" region and the computing resources are also provisioned in the home region. The "home" region can also be known as the "master" region. For example, the computing resources may be provisioned in CSP provided data centers in the home region and the customer data is also stored in the home region. The customer may decide to extend the customer's tenancy from the home region to a new extended region. For example, the customer's home region may be in the US region, and the customer may extend it to the Asia region. In response to this extension, the customer's data in the home region is replicated to the new extended region. The replication operation can be complicated and time consuming because of the typical number and size of the data to be replicated, the geographical distances between the regions, the technical capabilities of the regions (e.g., capabilities at the home region for communicating the data, capabilities at the extended region for receiving and ingesting the data) and other factors. This can result in poor customer experience. Worse, it can impact other tenant-based services provided in the home and/or new region for other customers.

SUMMARY

According to some implementations, a method may include receiving a request to extend a data tenancy to an extended region; identifying data records associated with the data tenancy to be extended to the extended region; determining whether a dedicated channel needs to be used, wherein the dedicated channel is separate from an existing channel between the home region and the extended region; and communicating the identified data records from the first server in the home region to a second server in the extended region via a secondary communication channel.

According to some implementations, a method may include receiving a request to extend a data tenancy from a home region; communicating the request to the home region via a dedicated communication channel; based in part on a number of data records associated with the data tenancy in the home region, receiving replicated data records for the data tenancy over the dedicated communication channel; processing the replicated data records; and backfilling the replicated data records.

According to some implementations, a non-transitory computer-readable medium may store one or more instructions. The one or more instructions, when executed by one or more processors of a server, may cause the one or more processors to: receive a request to extend a data tenancy to an extended region; identify stored data records associated with the data tenancy to be extended to the extended region; determine whether a dedicated channel needs to be used, wherein the dedicated channel is separate from an existing channel between the home region and the extended region; and determine a size of the identified data records; based in part on the size of the stored data records, selecting a secondary communication channel between a first server in a home region and a second server in the extended region, wherein the secondary communication channel is dedicated to replicating the stored data records from the first server in the home region to the second server in the extended region; and communicate the identified data records from the first server in the home region to the second server in the extended region via the secondary communication channel.

The present disclosure relates generally to infrastructure for providing cloud-based services. More particularly, techniques are described for replicating data efficiently for a tenancy between regions. For example, the data replication may be performed when a customer tenancy is extended from an existing home region to a new extended region. Responsive to such a regional extension or expansion of the tenancy, techniques described herein may be used to efficiently replicate tenancy-associated records from the home region to the extended region. The replication is performed using a dedicated communication channel that enables the replication to be performed in an efficient and timely manner and with minimal impact on other communications between the two regions. Various embodiments are described herein, including methods, systems, non-transitory computer-readable storage media storing programs, code, or instructions executable by one or more processors, and the like.

These and other embodiments are described in detail below. For example, other embodiments are directed to systems, devices, and computer readable media associated with methods described herein.

A better understanding of the nature and advantages of embodiments of the present disclosed may be gained with reference to the following detailed description and the accompanying drawings.

DETAILED DESCRIPTION

Figure 1:
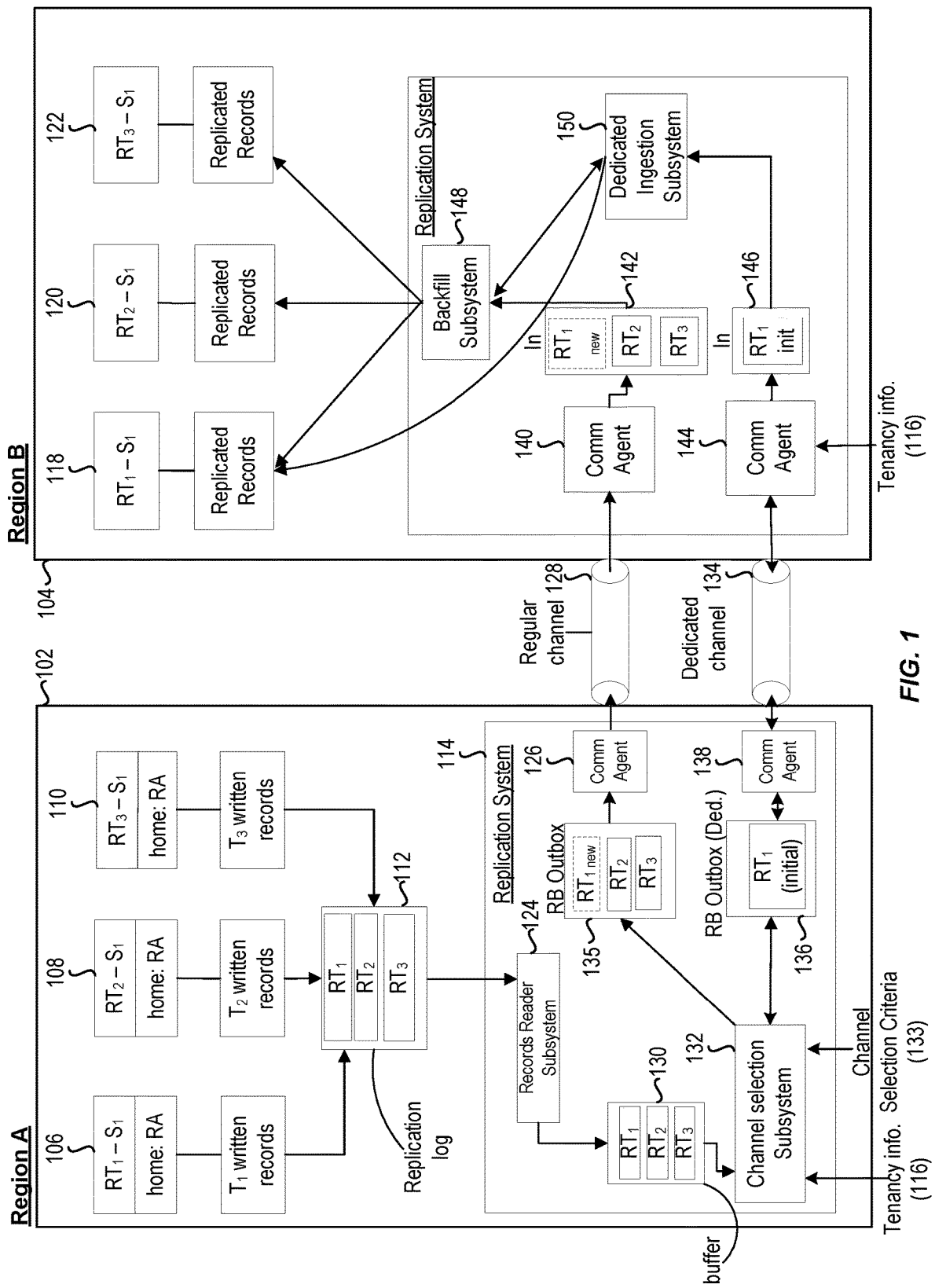
FIG. 1 is a simplified drawing of an improved cloud-based storage system for replicating stored data between different geographic regions.

The following detailed description of example implementations refers to the accompanying drawings. The same reference numbers in different drawings may identify the same or similar elements.

The present disclosure relates generally to infrastructure for providing cloud-based services. More particularly, techniques are described for replicating data efficiently for a tenancy between regions. For example, the data replication may be performed when a customer tenancy is extended from an existing home region to a new extended region. Responsive to such a regional extension or expansion of the tenancy, techniques described herein may be used to efficiently replicate tenancy-associated records from the home region to the extended region. The replication is performed using a dedicated communication channel that enables the replication to be performed in an efficient and timely manner and with minimal impact on other communications between the two regions. Various embodiments are described herein, including methods, systems, non-transitory computer-readable storage media storing programs, code, or instructions executable by one or more processors, and the like.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud-computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

The term cloud service is generally used to refer to a service that is made available by a cloud services provider (CSP) to users or customers on demand (e.g., via a subscription model) using systems and infrastructure (cloud infrastructure) provided by the cloud services provider.

Typically, the servers and systems that make up the CSP's infrastructure are separate from the customer's own on premise servers and systems. Customers can thus avail themselves of cloud services provided by a CSP without having to purchase separate hardware and software resources for the services. There are various different types or models of cloud services including Software-as-a-Service (SaaS), Platform-as-a-Service (PaaS), Infrastructure-as-a-Service (IaaS), and others. Cloud services are designed to provide easy, scalable access to applications, resources and services. There are several cloud service providers that offer various types of cloud services.

A customer can subscribe to one or more cloud services provided by a CSP. A customer is any entity that subscribes to a cloud service provided by the CSP. A customer can subscribe to one or more cloud services including services of different types including SaaS, PaaS, IaaS, and other types of cloud services. When a customer subscribes to or registers for a service provided by a CSP, a tenancy or an account is created for that customer. The customer has access to this account and can use it to access cloud resources associated with the account.

In certain embodiments, a CSP may provide services under an IaaS model, wherein the CSP provides infrastructure (referred to as cloud services provider infrastructure (CSPI) that can be used by customers to build their own customizable networks and deploy customer resources. The CSPI may comprise interconnected high-performance computer resources including various host machines, memory resources, and network resources that form a physical network, which is also referred to as a substrate network or an underlay network. The resources in CSPI may be spread across one or more data centers that may be geographically spread across one or more regions. The physical network provides the underlying basis for creating one or more virtual or overlay networks on top of the physical network. These virtual or overlay networks (also referred to as software-based or -defined networks) are implemented using software virtualization technologies to create layers of network abstraction that can be run on top of the physical network. Overlay networks can take on many forms, including peer-to-peer networks, IP networks, virtual Local Area Networks (vLANs), and others. Overlay networks typically use Layer-3 IP addressing with endpoints designated by their virtual IP addresses. This method of overlay networking is often referred to as virtual Layer 3 networking. Examples of protocols developed for overlay networks include IP, Virtual Extensible LAN (VXLAN—IETF RFC 7348), Virtual Private Networks (VPNs), VMware's NSX, and others. CSPI provides infrastructure and a set of complementary cloud services that enable customers to build and run a wide range of applications and services in a highly available hosted environment. CSPI offers high-performance computer resources and capabilities and storage capacity in a flexible overlay virtual network that is securely accessible from various networked locations such as from a customer's on-premises network. When a customer subscribes to or registers for an IaaS service provided by a CSP, the tenancy created for that customer is a secure and isolated partition within the CSPI where the customer can create, organize, and administer their cloud resources.

Customers can build their own networks using physical compute, memory, and networking resources provided by CSPI. One or more customer resources, such as compute instances, can be deployed on these networks. For example, a customer can use resources provided by CSPI to build one or multiple customizable and private network(s), referred to as a virtual cloud network (VCN). A customer can deploy one or more customer resources, such as compute instances, on these customer VCNs. Compute instances can take the form of virtual machines, containers, bare metal instances, and the like. The CSPI thus provides infrastructure and a set of complementary cloud services that enable customers to build and run a wide range of applications and services in a highly available hosted environment. The customer does not manage or control the underlying physical resources provided by CSPI but has control over operating systems, storage, and deployed applications; and possibly limited control of select networking components (e.g., firewalls).

The CSP may provide a console that enables customers and network administrators of the CSP to configure, access, and manage resources deployed in the cloud using CSPI resources. In certain embodiments, the console provides a web-based user interface that can be used to access and manage CSPI. In some implementations, the console is a web-based application provided by the CSP.

From the CSP's perspective, resources provided by the CSP and used to provide services to the CSP's customers can be single tenancy or multi-tenancy. In certain embodiments, a single tenancy is when a single instance of software and supporting infrastructure serves a single customer and provides them their own independent set of resources that are not shared with another customer or tenant. In contrast, multi-tenancy is when a single instance of the software and its supporting infrastructure serves multiple customers or tenants. In a multi-tenancy situation, the CSP takes precautions to ensure that each tenant's data is isolated and remains invisible to other tenants.

As indicated above, the CSPI forms a physical network on which one or more virtual overlay networks may be built. In a physical network, a network endpoint (or endpoint for short) refers to a computing device that is connected to a physical network and communicates back and forth with the network to which it is connected. An endpoint may be connected to a Local Area Network (LAN), a Wide Area Network (WAN), or other type of physical network. Examples of traditional endpoints in a physical network include modems, hubs, bridges, switches, and other networking devices, physical computers (or host machines), and the like. Each physical device in the physical network has a fixed network address that can be used to communicate with the device. For example, a fixed Layer 2 address (e.g., a MAC address), a fixed Layer 3 address (e.g., an IP address), and the like. In a virtual overlay network, the endpoints can include virtual endpoints such as virtual machines that are hosted by components of the physical network (e.g., hosted by physical host machines). These endpoints in the overlay network are addressed by virtual addresses such as virtual Layer 2 addresses (e.g., virtual MAC addresses) and virtual Layer 3 addresses (e.g., virtual IP addresses). Network overlays enable flexibility by allowing network managers to move around the virtual addresses associated with network endpoints using software management. Accordingly, unlike in a physical network, in a virtual overlay network, a virtual address (e.g., a virtual IP addresses) can be moved from one virtual endpoint to another using network management software.

Addresses associated with components in the virtual overlay network are virtual addresses (e.g., virtual IP addresses, virtual MAC addresses). These are to be differentiated from addresses associated with components in the physical network. Since the virtual overlay network is built on top of a physical network, communications between components in the virtual overlay network involves both the overlay network and the underlying physical network. In order to facilitate such communications, mappings are learnt and stored mapping the virtual addresses to corresponding actual physical addresses and vice versa. These mappings are then used to facilitate the communications.

The CSPI may be physically hosted in one or more data centers around the world. The CSPI may include components in the physical or substrate network and virtualized components (e.g., virtual networks, compute instances, container, virtual machines, etc.) that are in an overlay network built on top of the physical network components. In certain embodiments, the CSPI is organized and hosted in realms, regions and availability domains. A region is a localized geographic area that contains one or more data centers. Regions are generally independent of other regions and can be separated by vast distances, for example, across countries or even continents. For example, a first region may be in Australia, another one in Japan, yet another one in India, and the like. Generally, an application is deployed in a region where it is most heavily used, because using nearby resources is faster than using distant resources. Applications can also be deployed in different regions for various reasons, such as to mitigate the risk of region-wide events such as large weather systems or earthquakes, to meet varying requirements for legal jurisdictions, tax domains, and other business or social criteria, and the like. Each region may provide a set of core infrastructure services and resources, such as, compute resources (e.g., bare metal servers, virtual machine, containers and related infrastructure, etc.); storage resources (e.g., block volume storage, file storage, object storage, archive storage); networking resources (e.g., virtual cloud networks (VCNs), load balancing resources, connections to on premise networks), database resources; edge networking resources (e.g., DNS); and access management and monitoring resources, and others.

The data centers within a region can be further organized and subdivided into availability domains (ADs). An availability domain may correspond to one or more data centers located within a region. A region can be composed of one or more availability domains. In such a distributed environment, cloud infrastructure resources are either region-specific, such as a virtual cloud network (VCN), or availability domain-specific, such as a compute instance. Traffic between availability domains is usually encrypted.

ADs are isolated from each other, fault tolerant, and are configured such that they are very unlikely to fail simultaneously. This is achieved by the ADs not sharing critical infrastructure resources such as power or cooling, such that a failure at one AD within a region is unlikely to impact the availability of the other ADs within the same region. The ADs within the same region may be connected to each other by a low latency, high bandwidth network, which makes it possible to provide high-availability connectivity to other networks (e.g., the Internet, customers' on premise networks, etc.) and to build replicated systems in multiple ADs for both high-availability and disaster recovery. Cloud services use multiple ADs to ensure high availability and to protect against resource failure As the infrastructure provided by the IaaS provider grows, more regions and ADs may be added with additional capacity.

In certain embodiments, regions are grouped into realms. A realm may be a logical collection of regions. Realms are isolated from each other and do not share any data. A customer's tenancy or account with the CSP exists in a single realm and can access regions that belong to that realm. A customer cannot access regions that are not in the realm where the customer's tenancy exists. An IaaS CSP can provide multiple realms, each realm catered to a particular set of users. Examples of realms include a commercial realm, a realm for a specific country, a realm for a government, and the like. For example, the government realm may be catered for a specific government and may have a heightened level of security than a commercial realm. Oracle Cloud Infrastructure currently offers a realm for commercial regions and two realms for government cloud regions: FedRAMP authorized and IL5 authorized.

In certain embodiments, an AD can be subdivided into one or more fault domains. A fault domain is a grouping of infrastructure resources within an AD to provide anti-affinity. Fault domains allow for the distribution of instances such that the instances are not on the same physical hardware within a single AD. This is known as anti-affinity. Due to this, a hardware failure or computer hardware maintenance event that affects one fault domain does not affect instances in other fault domains. In addition, the physical hardware in a fault domain has independent and redundant power supplies, which prevents a failure in the power supply hardware within one fault domain from affecting other fault domains. Depending on the embodiment, the number of fault domains for each AD may vary. For instance, in certain embodiments each AD contains three fault domains. A fault domain acts as a logical data center within an AD.

FIG. 1 is a simplified drawing of an improved cloud-based storage system for replicating stored data between different geographic regions. Data can be stored in one or more database servers serving a region. The region can identify a geographic area (e.g., North America or Europe, etc.) The term region can also be used identify a portion of a geographic area (e.g., United States (West)). FIG. 1 illustrates two regions, a first region 102 (e.g., Region A) 102 and a second region 104 (e.g., Region B).

Each region can include data for one or more tenants (i.e., a client) in the cloud based server for the region. For example, an international bank may store the bank's customer data in a first region (e.g., North America). The tenancy data can include the data itself and metadata associated with the data. Each region can host numerous tenancies. For example, FIG. 1 illustrates that a first region 102 (e.g., Region A) hosts the following tenancies: $T_1$ 106, $T_2$ 108 and $T_3$ 110. The first region 102 (e.g., Region A) can be designated as the home region for tenancies $T_1$ 106, $T_2$ 108, and $T_3$ 110. The cloud based data servers for region A 102 can store written records for each of the tenancies $T_1$ 106, $T_2$ 108, and $T_3$ 110.

Customers can subscribe to certain data tenancies by data tenancy and by region. Therefore, a customer may identify which data tenancies and which region that access will be granted in the subscription. For example, as illustrated a customer is subscribed to tenancies $T_1$ 106, $T_2$ 108, and $T_3$ 110 in a first region 102 (e.g., Region A). On occasion, customers desire to extend their data access to various other regions. It is desirable that customer data be consistent across the various regions. In this way, a customer accessing data in a first region will have consistent experience accessing the data in a second region. In order to achieve this consistency when a customer subscribes to a new region for a tenancy, the tenancy data will need to be replicated to the cloud-based storage system for the new region.

A replication log 112 can be maintained to track the data records and metadata for each of the data tenancies stored in a first region 102 (e.g., Region A). The replication log 112 can provide information regarding the data records to the replication system 114 when a request to replicate data to a new region is received. The replication log 112 can store the number of records for each tenancy. The replication log 112 can store information on the size in bits of each of the records for each tenancy. The replication log 112 can identify the one or more records from the one or more tenancies that have been updated. The updated records can be replicated in the various other regions for which a customer is subscribed.

The replication system 114 can maintain consistency of the tenancy data across the various cloud-based storage systems in the various regions. As data records are updated or changed in each of the tenancies in one region, the changes or updates will need to be replicated in the other regional storage systems. In this way, a customer will have consistent data across multiple different regions. Also, when a customer does not subscribe to tenancy data in a different region other than the home region, the replication system does not need to replicate the data to different regions. This allows for efficiency in maintaining the data because unsubscribed data need not be replicated in the new region.

The replication system 114 can also replicate data for new subscriptions for data tenancies in different regions. The replication system 114 can receive new tenancy information 116 indicating a request to subscribe to a new a tenancy in a new region. For example, as illustrated in FIG. 1, a customer is subscribed to tenancies $T_1$ 106, $T_2$ 108, and $T_3$ 110 in a first region 102 (e.g., Region A). Initially, the customer is subscribed to tenancies $T_2$ 120 and $T_3$ 122 in a second region 104 (e.g., Region B). In various embodiments, new tenancy information 116 can be received by the replication system 114 of a first region 102 (e.g., Region A). The new tenancy information 116 can include a request to subscribe to tenancy $T_1$ 118 in a second region 104 (e.g., Region B). In order to provide the consistent data experience in a second region 104 (e.g., Region B), the data records from tenancy $T_1$ 102 will need to be replicated to a second region 104 (e.g., Region B). In some embodiments, the replicated data records from $T_1$ 102 can be communicated by a communication agent 126 over a regular channel 128.

A dedicated channel for replicating data is not advantageous solely due to the size of the pipeline to communicate the data. The issues caused by replicating the data is due to the processing time for the incoming records. The processing time for record ingestion on the new sever can cause delays not only with the ingestion of the records for the extended data tenancy, but it also can delay other data (e.g., updates or changes from existing data tenancies in the new region). By providing a dedicated channel for replicating the extended tenancy data to the new region, the updates/changes can be communicated unimpeded to the new region server, providing a consistent customer experience without delays during the ingestion.

The replication system 114 can include a records reader subsystem 124. The records reader subsystem 124 can access the replication log 112 to determine the records that have been updated or have changed. In addition, the records reader subsystem 124 can identify the records that need to be replicated to the new region due to a subscription change. These records can be stored in a buffer 130. The buffer 130 is a temporary storage for replicated date. The buffer 130 can include records for tenancies $T_1$ 106, $T_2$ 108, and $T_3$ 110.

The records can be sent from the buffer 130 to the channel selection subsystem 132. The channel selection subsystem 132 can receive information concerning the number or records that need to be extended to a new region. The channel selection subsystem 132 can also receive information on the number of bits of each of the data records that needs to be replicated. In various embodiments, the channel selection subsystem 132 can determine if the data records are communicated via a regular channel 128 or a dedicated channel 134. The channel selection subsystem 132 can receive channel selection criteria 133. The channel selection criteria 133 can include but is not limited to a number of records, a size of the records, and The channel selection subsystem 132 can decide whether the data records will be communicated via the regular channel 128 or a dedicated (e.g., secondary) channel 134. In various embodiments, if the number of records to be replicated exceeds a threshold value the data records will be communicated via the dedicated channel 134. As shown in FIG. 1, channel selection subsystem 132 can select the dedicated channel 134 for replicating the data records for tenancy $T_1$ 106 to the new region. The data records for tenancy $T_1$ 106 can be sent to a dedicated outbox 136. The outbox 136 is a storage for outgoing replicated records prior to being communicated to another region. The data records can be sent via communication agent 138 via the dedicated channel 134 via the communication agent 144 of a second region 104 (e.g., Region B). If the number of records to be replicated does not exceed the threshold value the data records can be communicated via the regular (e.g., primary) channel 128.

In various embodiments, if one or more records of the data records to be replicated exceeds a threshold size in number of bits, those data records will be communicated via the dedicated channel 134. If the size of the one or more data records to be replicated does not exceed the threshold value number of bits, the data records can be communicated via the regular (e.g., primary) channel 128.

The channel selection subsystem 132 can select the regular channel 128 for communicating data records that have been changed or updated in existing subscriptions to a second region 104 (e.g., Region B). As illustrated in FIG. 1, the data records for tenancies $T_2$ 108, and $T_3$ 110 can be communicated via the regular channel 128 to a second region 104 (e.g., Region B).

In various embodiments, the data records to be replicated or updated can be communicated from the channel selection subsystem 132 to an outbox (e.g., Region B Outbox 135). The data records from the Region B Outbox 135 can be communicated via a communication agent 126 to be communicated over a regular channel 128 to a communication agent 140 of a second region 104 (e.g., Region B). The data records can be then stored in an Inbox 142 for a second region 104 (e.g., Region B). The data records can be processed via the backfill subsystem 148 and stored in the data storage for tenancies $T_2$ 120 and $T_3$ 122.

In various embodiments, the data records to be replicated or updated can be communicated from the channel selection subsystem 132 to an outbox (e.g., dedicated Region B Outbox 136). The data records from the dedicated Region B Outbox 136 can be communicated a communication agent 138 to be communicated over a dedicated channel 134 to a communication agent 144 of a second region 104 (e.g., Region B). The data records can be then stored in an Inbox 146 for a second region 104 (e.g., Region B). The data records can be processed via the dedicated ingestion subsystem 150 and stored in the data storage for tenancies $T_1$ 118.

In various embodiments, the replicated data records and the updated data records can be communicated simultaneously via the dedicated channel 134 and the regular channel 128. The replicated data records and the updated data records can be stored in the regular Inbox 142 and the dedicated Inbox 146. Each of the data records can be provided a sequence number for each tenancy. For example, the replicated data records can include sequence numbers from 1 to 1,000. Similarly, the updated data records can be provided sequence numbers identifying which records the updates correspond to. For example, while replicating the data records for tenancy $T_1$ 106 updated records can be received for a data record for tenancy $T_1$. For example, tenancy $T_1$ 106 can include 1000 records. In an example, an update can be received for record number 52. In this case, the backfill system 148 can wait until backfill subsystem 150 has replicated data records 1 through 52 prior to updating data record 52.

Figure 2:
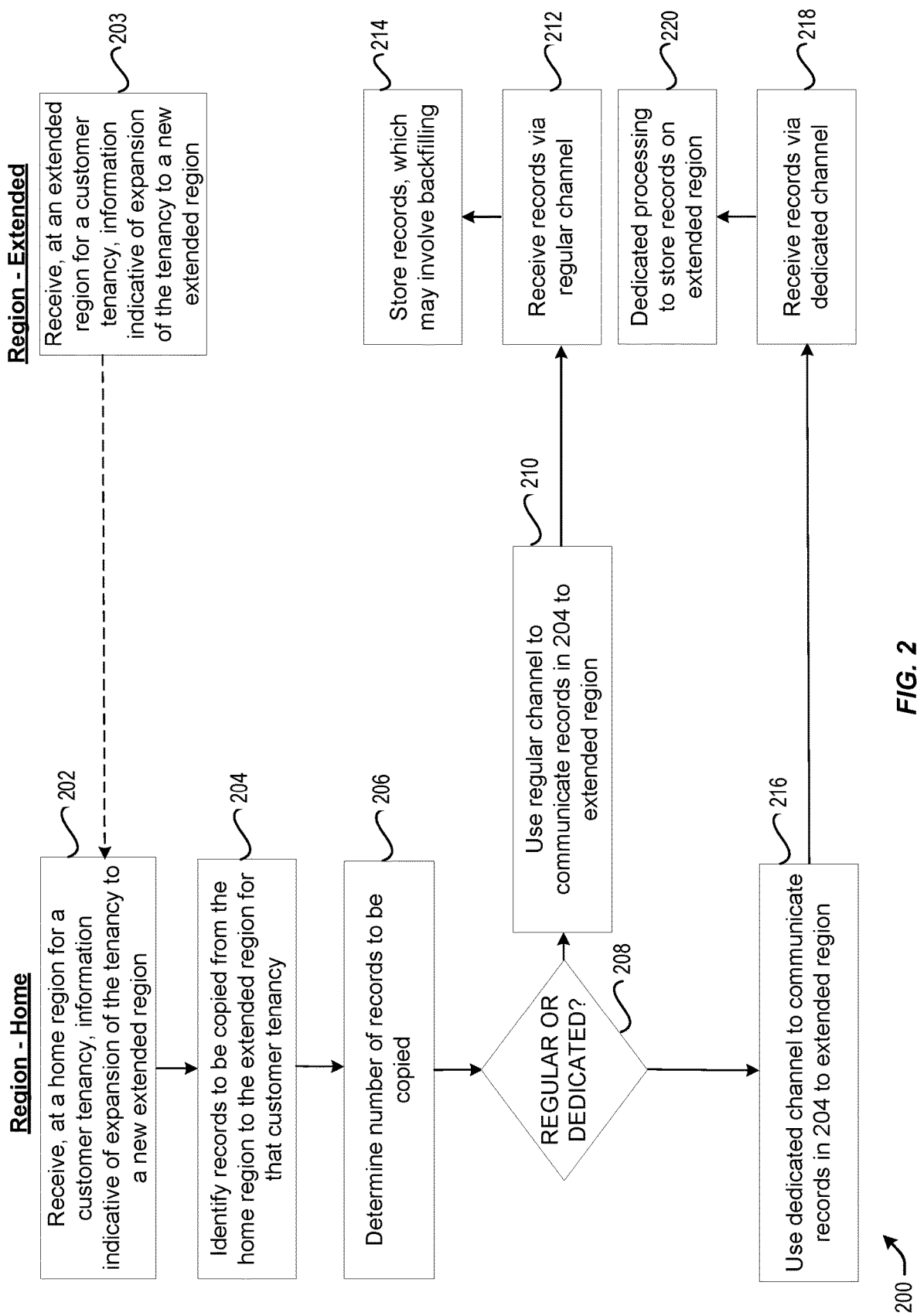
FIG. 2 is a simplified flow for a technique for extending data records from a first region to a second region from the perspective of a first server.

FIG. 2 is a simplified flow diagram for a technique for extending data records from a home region to an extended region. In various embodiments, the regions can be different geographic regions (e.g., North America and Europe). The regions can also be different portions of a geographic region (e.g., United States East and United States West).

At 202, the first server can receive, at a home region for a customer tenancy, information indicative of expansion of the tenancy to a new extended region. The request can identify the tenancy home. The request can also include the region identifier for the new region. For example, the home region can be United States and the extended region can be Europe. The new tenancy information can be received by the channel selection subsystem 132 for the replication system 114 as shown in FIG. 1. The request can be generated following a selection by a user on a graphical user interface. The request can be generated based on receipt of an electronic message.

In various embodiments, the first server can receive, at 203, information indicative of expansion of the customer tenancy from the extended region. In various embodiments, the request can be transmitted to the channel selection subsystem 132, as shown in FIG. 1, via the dedicated channel 134, as shown in FIG. 1.

At 204, the first server can identify records to be copied from the home region to the extended region for that customer tenancy. Each data record can include metadata that identifies the home region for the customer tenancy. After receiving the tenancy information to be extended, the processor of the first server can identify the records associated with the home tenancy by analyzing the metadata information.

At 206, the first server can determine the number of records in the tenancy to be copied to the extended region. The processor of the server can identify a number of identified records. The processor of the server can identify a total size (i.e., in bytes) of the identified records. The processor of the server can identify a sequence listing of the identified records. The number of records, the size of identified records, and the sequence listing of the identified records can be stored in a memory of the server.

At 208, the first server can determine whether a regular or dedicated channel is to be used for communicating the data records of the tenancy to the new region. In various embodiments, all of the records can be replicated via the regular channel. In various embodiments, if the number of records exceeds a predetermined threshold the replicated records will be communicated via the dedicated communication channel. In various embodiments, if the size (in bits) of one or more of the data records exceeds a certain predetermined number of bits the records can be communicated via the dedicated communication channel. In various embodiments, if the number of records is under the predetermined threshold, the records can be communicated via the regular channel. In various embodiments, if the size of one or more of the records does not exceed a predetermined number of bits the records can be communicated via the regular channel. In various embodiments, other criteria can be used to determine the channel for communicating the threshold records.

For example, in some embodiments the first server can consider the number of records in the inbox 142 for the new region (e.g., a second region 104 (e.g., Region B)) as shown in FIG. 1. In various embodiments, the first server can receive information on the processing rate for replicated records in the new region (e.g., a second region 104 (e.g., Region B)) as shown in FIG. 1.

In various embodiments, the decision for the dedicated or regular channel can be based on various conditions. The channel selection subsystem 132, shown in FIG. 1, can receive channel selection criteria 133. In a first condition, anytime there is an initial copy of records from a home region to the extended region the records will be communicated over the dedicated channel, regardless of other factors. In a second condition, for a first time that records are being copied to an extended region and the number of records is over a threshold, the identified records will be communicated over the dedicated channel. In a third condition, for a first time that records are being copied to an extended region and the size of the download of identified records is over a threshold the identified records will be communicated over the dedicated channel. In a fourth condition, for a first time that records are being copied to an extended region plus some combination of other previous three criteria the identified records will be communicated over the dedicated channel.

At 210, the first server can use the regular channel to communicate the identified records to the extended region. For example, the channel selection subsystem 132 can send the records to the Region B Outbox 135, communicated via a communication agent 126 over the regular channel 128.

At 212, the communication agent 140 of the extended region can receive the records via the regular channel 128. The received records can be stored in an inbox 142 for processing by the backfill subsystem 148 of the extended region.

At 214, the backfill subsystem 148, can store the records which may involve backfilling. The records can be stored in a storage system (i.e., cloud storage) specific to the customer tenancy (e.g., $RT_1$ 118, $RT_1$ 120, and RT1 122) of the extended region.

At 216, the first server can use a dedicated channel to communicate the identified records to the extended region. The channel selection subsystem 132 can send the records to the Region B outbox 136 and communicated via the communication agent 138 via a dedicated channel 134 to the extended region.

The first server can identify a dedicated channel to replicate the data records. In various embodiments one or more communication channels may be pre-established between the first server in a home region and the second sever in an extended region. For example, a regular channel 128 may already be established. The regular channel 128 can be considered the primary channel for communicating the records from the home region to the extended region. One or more additional channels may also be established between the home region and the extended region. For example, a secondary channel can be established as the dedicated channel 134. The dedicated channel 134 can be reserved for communicated the replicated data records from the first server in the home region and the second sever in the extended region.

In various embodiments, the secondary channel may not be established and the first server will need to establish the secondary channel. Establishing the secondary channel can include identifying a memory space for storing the replicated data records and writing the replicated data records to the memory space.

In various embodiments, the data records can be communicated via wired or wireless means via the communication agent 138 (dedicated channel) or communication agent 126 (primary channel). The records can be communicated via a network (e.g., the Internet).

At 218, the communication agent 144 of the extended region can receive the identified records. The received records can be stored in an inbox 146 for processing by the dedicated ingestion subsystem.

At 220, the second sever can perform dedicated processing to store the records in the extended region. The records can be stored in a storage system (i.e., cloud-based storage device) specific to the customer tenancy (e.g., $RT_1$ 118, $RT_2$ 120, and $RT_3$ 122) of the extended region.

The second server can process the incoming records. The dedicated ingestion subsystem 150 can perform one or more steps to process the replicated data records. In some cases, the processing of the data can take longer than the communication of the data from the first region to the second region. For example, when a write happens to a tenancy, it results in a commit/write log, which is just a record of the change happening to the data. Usually all the records that are being replicated are just the change logs. It is not possible for the system to combine those data records into one record because those records are just about changes to tenancy data. For example, if on an identity service there were 5 create user calls (create user A-E). If the system were to merge those 5 records into 1 record, it still needs to reflect that 5 users are being created, the second sever with the replicated data still has to create 5 users, so the ingestion time taken by the service to consume 5 records versus consuming 1 record for 5 users, is the same.

In various embodiments, the dedicated channel can be closed upon completion of communicating the replicated data records to the new region.

Figure 3:
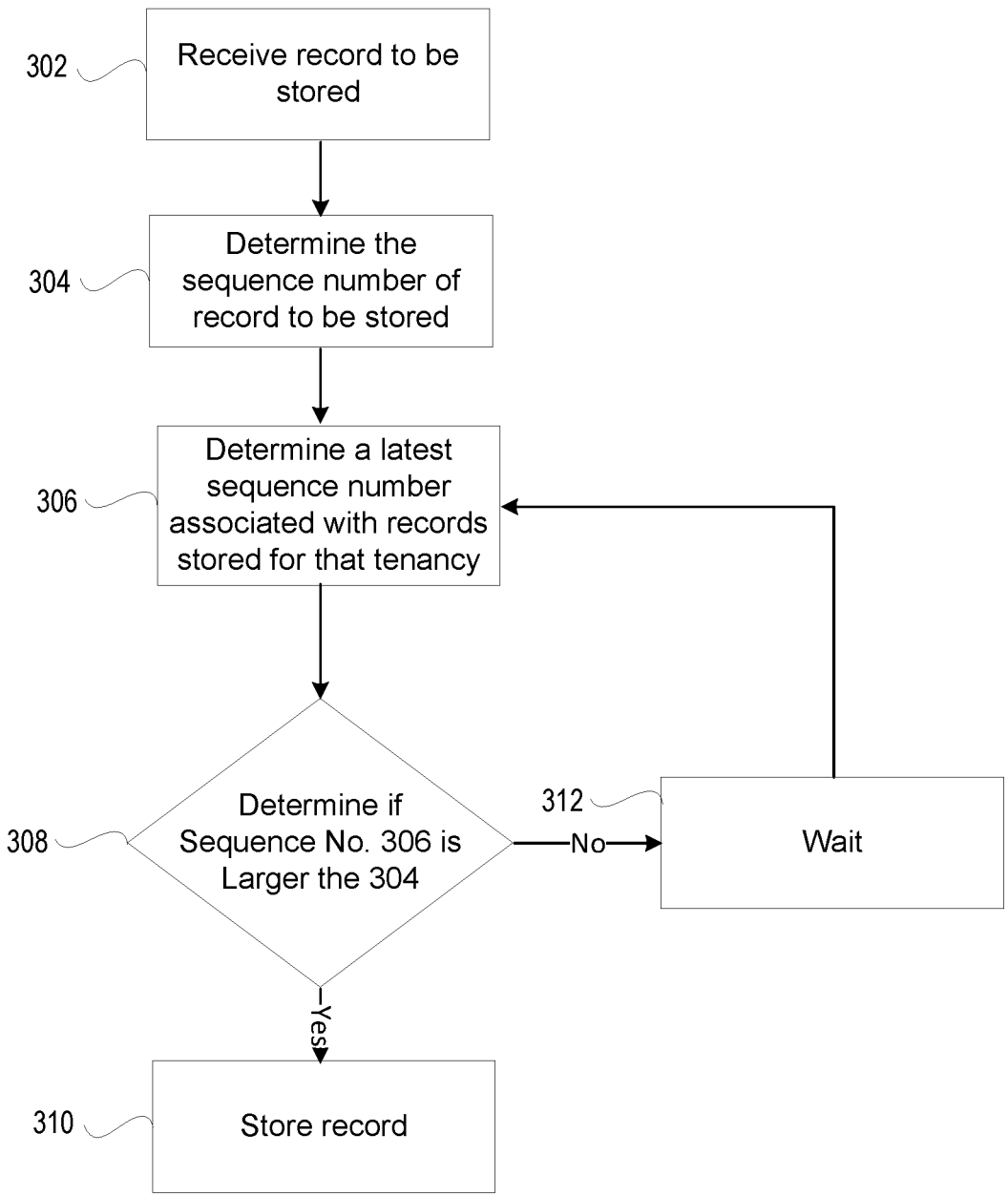
FIG. 3 is a simplified flow for a technique for extending data records from a first region to a second region from the perspective of a second server.

FIG. 3 is a simplified flow for a technique for extending data records from a home region to an extended region from the perspective of a second server in the extended region. In various embodiments, the regions can be different geographic regions (e.g., North America and Europe). The regions can also be different portions of a geographic region (e.g., United States East and United States West).

Under certain conditions, the backfill subsystem 148 may receive one more data record updated for a customer tenancy that is in the process of being copied to the extended region. The customer tenancy records that are being copied to the extended region need to be processed by the dedicated ingestion subsystem 150 prior to being stored. The records can each have a sequence number and the dedicated ingestion subsystem 150 cab process the records in sequential order.

At 302, the server can receive a data record to be store. This record can be received at the backfill subsystem 148 as shown in FIG. 1.

At 304, the server can determine the sequence number of the data record to be stored. The sequence number can be stored as metadata for the data record. For example, the sequence number can be determined to be sequence number 50.

At 306, the server can determine a latest sequence number associated with records stored for that customer tenancy. The backfill subsystem 148 can communicate with the dedicated ingestion system 150 requesting the information on the current sequence number of the data records being ingested for the received records for the customer tenancy.

At 308, the server can determine if the current sequence number is larger than the sequence number for the updated record received. The processor of the server can compare the current sequence number with the sequence number for the updated record.

If the current sequence number is larger than the sequence number of the updated record the process can store, at 310, the record.

If the current sequence number is not larger than the sequence number of the updated record the process can, at 312, wait and proceed to step 306.

Figure 4:
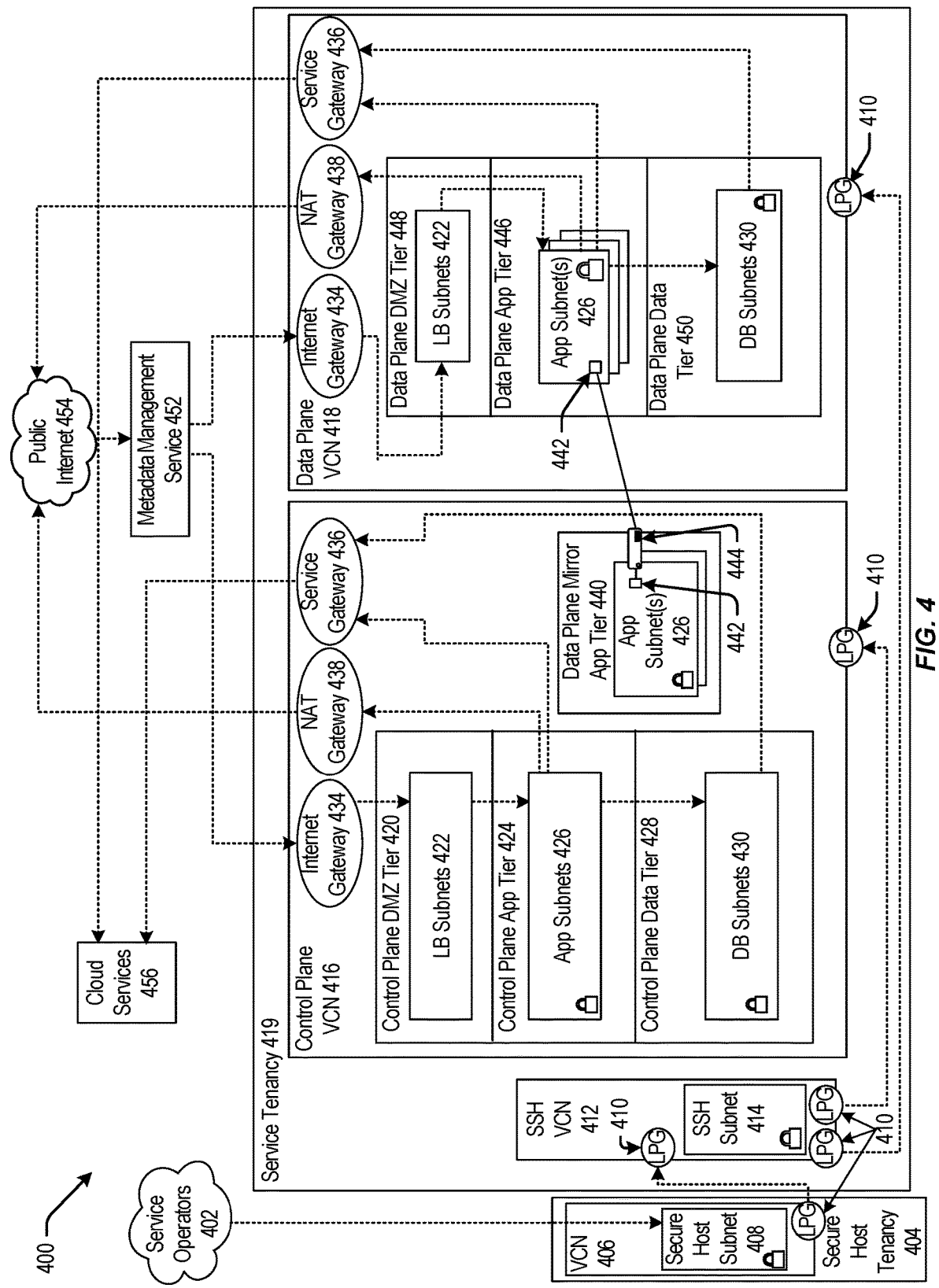
FIG. 4 is a block diagram illustrating another pattern for implementing a cloud infrastructure as a service system, according to at least one embodiment.

FIG. 4 is a block diagram 400 illustrating an example pattern of an IaaS architecture, according to at least one embodiment. Service operators 402 can be communicatively coupled to a secure host tenancy 404 that can include a virtual cloud network (VCN) 406 and a secure host subnet 408. In some examples, the service operators 402 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 406 and/or the Internet.

The VCN 406 can include a local peering gateway (LPG) 410 that can be communicatively coupled to a secure shell (SSH) VCN 412 via an LPG 410 contained in the SSH VCN 412. The SSH VCN 412 can include an SSH subnet 414, and the SSH VCN 412 can be communicatively coupled to a control plane VCN 416 via the LPG 410 contained in the control plane VCN 416. Also, the SSH VCN 412 can be communicatively coupled to a data plane VCN 418 via an LPG 410. The control plane VCN 416 and the data plane VCN 418 can be contained in a service tenancy 419 that can be owned and/or operated by the IaaS provider.

The control plane VCN 416 can include a control plane demilitarized zone (DMZ) tier 420 that acts as a perimeter network (e.g., portions of a corporate network between the corporate intranet and external networks). The DMZ-based servers may have restricted responsibilities and help keep security breaches contained. Additionally, the DMZ tier 420 can include one or more load balancer (LB) subnet(s) 422, a control plane app tier 424 that can include app subnet(s) 426, a control plane data tier 428 that can include database (DB) subnet(s) 430 (e.g., frontend DB subnet(s) and/or backend DB subnet(s)). The LB subnet(s) 422 contained in the control plane DMZ tier 420 can be communicatively coupled to the app subnet(s) 426 contained in the control plane app tier 424 and an Internet gateway 434 that can be contained in the control plane VCN 416, and the app subnet(s) 426 can be communicatively coupled to the DB subnet(s) 430 contained in the control plane data tier 428 and a service gateway 436 and a network address translation (NAT) gateway 438. The control plane VCN 416 can include the service gateway 436 and the NAT gateway 438.

The control plane VCN 416 can include a data plane mirror app tier 440 that can include app subnet(s) 426. The app subnet(s) 426 contained in the data plane mirror app tier 440 can include a virtual network interface controller (VNIC) 442 that can execute a compute instance 444. The compute instance 444 can communicatively couple the app subnet(s) 426 of the data plane mirror app tier 440 to app subnet(s) 426 that can be contained in a data plane app tier 446.

The data plane VCN 418 can include the data plane app tier 446, a data plane DMZ tier 448, and a data plane data tier 450. The data plane DMZ tier 448 can include LB subnet(s) 422 that can be communicatively coupled to the app subnet(s) 426 of the data plane app tier 446 and the Internet gateway 434 of the data plane VCN 418. The app subnet(s) 426 can be communicatively coupled to the service gateway 436 of the data plane VCN 418 and the NAT gateway 438 of the data plane VCN 418. The data plane data tier 450 can also include the DB subnet(s) 430 that can be communicatively coupled to the app subnet(s) 426 of the data plane app tier 446.

The Internet gateway 434 of the control plane VCN 416 and of the data plane VCN 418 can be communicatively coupled to a metadata management service 452 that can be communicatively coupled to public Internet 454. Public Internet 454 can be communicatively coupled to the NAT gateway 438 of the control plane VCN 416 and of the data plane VCN 418. The service gateway 436 of the control plane VCN 416 and of the data plane VCN 418 can be communicatively couple to cloud services 456.

In some examples, the service gateway 436 of the control plane VCN 416 or of the data plane VCN 418 can make application programming interface (API) calls to cloud services 456 without going through public Internet 454. The API calls to cloud services 456 from the service gateway 436 can be one-way: the service gateway 436 can make API calls to cloud services 456, and cloud services 456 can send requested data to the service gateway 436. But, cloud services 456 may not initiate API calls to the service gateway 436.

In some examples, the secure host tenancy 404 can be directly connected to the service tenancy 419, which may be otherwise isolated. The secure host subnet 408 can communicate with the SSH subnet 414 through an LPG 410 that may enable two-way communication over an otherwise isolated system. Connecting the secure host subnet 408 to the SSH subnet 414 may give the secure host subnet 408 access to other entities within the service tenancy 419.

The control plane VCN 416 may allow users of the service tenancy 419 to set up or otherwise provision desired resources. Desired resources provisioned in the control plane VCN 416 may be deployed or otherwise used in the data plane VCN 418. In some examples, the control plane VCN 416 can be isolated from the data plane VCN 418, and the data plane mirror app tier 440 of the control plane VCN 416 can communicate with the data plane app tier 446 of the data plane VCN 418 via VNICs 442 that can be contained in the data plane mirror app tier 440 and the data plane app tier 446.

In some examples, users of the system, or customers, can make requests, for example create, read, update, or delete (CRUD) operations, through public Internet 454 that can communicate the requests to the metadata management service 452. The metadata management service 452 can communicate the request to the control plane VCN 416 through the Internet gateway 434. The request can be received by the LB subnet(s) 422 contained in the control plane DMZ tier 420. The LB subnet(s) 422 may determine that the request is valid, and in response to this determination, the LB subnet(s) 422 can transmit the request to app subnet(s) 426 contained in the control plane app tier 424. If the request is validated and requires a call to public Internet 454, the call to public Internet 454 may be transmitted to the NAT gateway 438 that can make the call to public Internet 454. Memory that may be desired to be stored by the request can be stored in the DB subnet(s) 430.

In some examples, the data plane mirror app tier 440 can facilitate direct communication between the control plane VCN 416 and the data plane VCN 418. For example, changes, updates, or other suitable modifications to configuration may be desired to be applied to the resources contained in the data plane VCN 418. Via a VNIC 442, the control plane VCN 416 can directly communicate with, and can thereby execute the changes, updates, or other suitable modifications to configuration to, resources contained in the data plane VCN 418.

In some embodiments, the control plane VCN 416 and the data plane VCN 418 can be contained in the service tenancy 419. In this case, the user, or the customer, of the system may not own or operate either the control plane VCN 416 or the data plane VCN 418. Instead, the IaaS provider may own or operate the control plane VCN 416 and the data plane VCN 418, both of which may be contained in the service tenancy 419. This embodiment can enable isolation of networks that may prevent users or customers from interacting with other users', or other customers', resources. Also, this embodiment may allow users or customers of the system to store databases privately without needing to rely on public Internet 454, which may not have a desired level of security, for storage.

In other embodiments, the LB subnet(s) 422 contained in the control plane VCN 416 can be configured to receive a signal from the service gateway 436. In this embodiment, the control plane VCN 416 and the data plane VCN 418 may be configured to be called by a customer of the IaaS provider without calling public Internet 454. Customers of the IaaS provider may desire this embodiment since database(s) that the customers use may be controlled by the IaaS provider and may be stored on the service tenancy 419, which may be isolated from public Internet 454.

Figure 5:
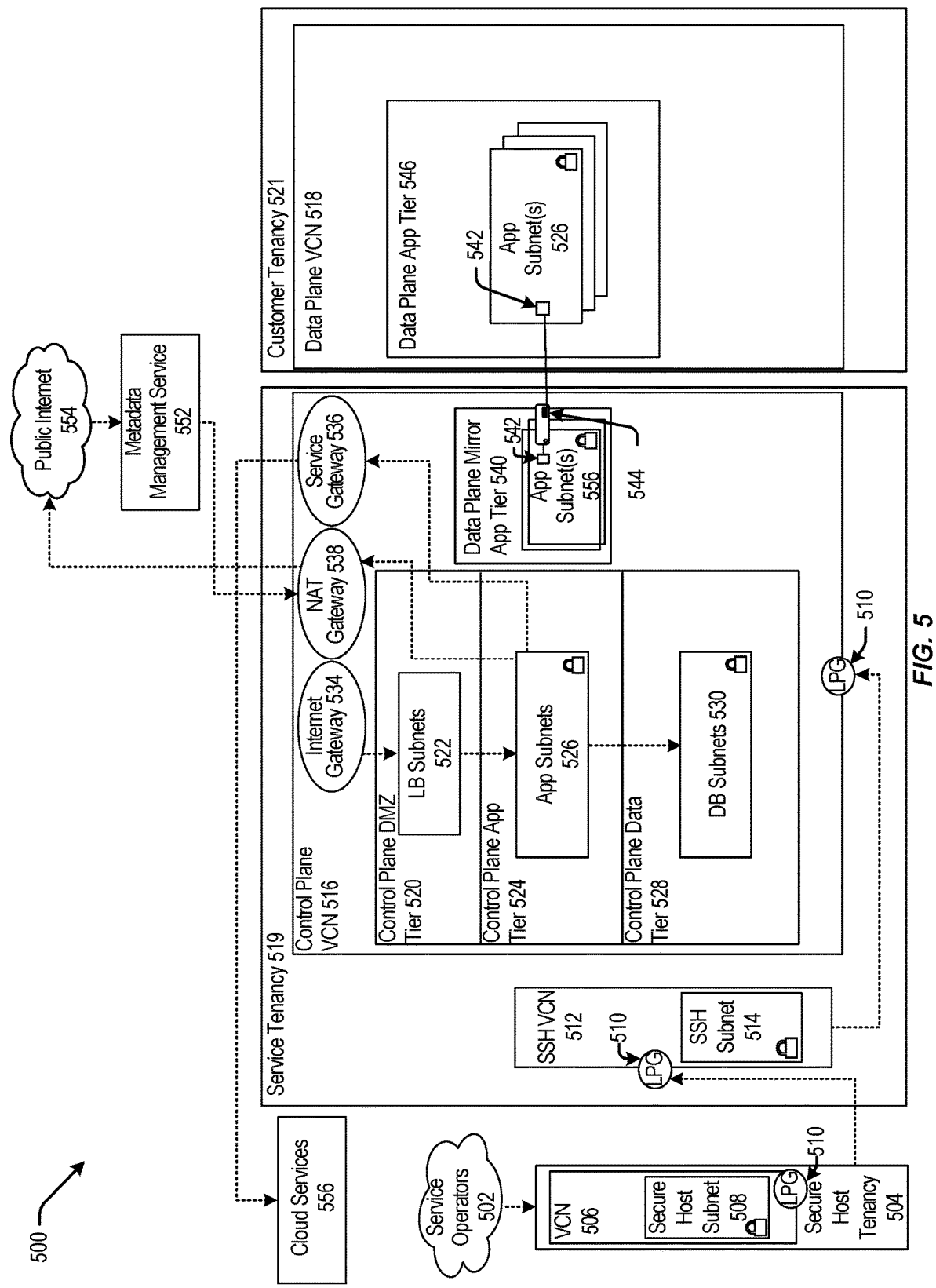
FIG. 5 is a block diagram illustrating another pattern for implementing a cloud infrastructure as a service system, according to at least one embodiment.

FIG. 5 is a block diagram 500 illustrating another example pattern of an IaaS architecture, according to at least one embodiment. Service operators 502 (e.g. service operators 402 of FIG. 4) can be communicatively coupled to a secure host tenancy 504 (e.g. the secure host tenancy 404 of FIG. 4) that can include a virtual cloud network (VCN) 506 (e.g. the VCN 406 of FIG. 4) and a secure host subnet 508 (e.g. the secure host subnet 408 of FIG. 4). The VCN 506 can include a local peering gateway (LPG) 510 (e.g. the LPG 410 of FIG. 4) that can be communicatively coupled to a secure shell (SSH) VCN 512 (e.g. the SSH VCN 412 of FIG. 4) via an LPG 410 contained in the SSH VCN 512. The SSH VCN 512 can include an SSH subnet 514 (e.g. the SSH subnet 414 of FIG. 4), and the SSH VCN 512 can be communicatively coupled to a control plane VCN 516 (e.g. the control plane VCN 416 of FIG. 4) via an LPG 510 contained in the control plane VCN 516. The control plane VCN 516 can be contained in a service tenancy 519 (e.g. the service tenancy 419 of FIG. 4), and the data plane VCN 518 (e.g. the data plane VCN 418 of FIG. 4) can be contained in a customer tenancy 521 that may be owned or operated by users, or customers, of the system.

The control plane VCN 516 can include a control plane DMZ tier 520 (e.g. the control plane DMZ tier 420 of FIG. 4) that can include LB subnet(s) 522 (e.g. LB subnet(s) 422 of FIG. 4), a control plane app tier 524 (e.g. the control plane app tier 424 of FIG. 4) that can include app subnet(s) 526 (e.g. app subnet(s) 426 of FIG. 4), a control plane data tier 528 (e.g. the control plane data tier 428 of FIG. 4) that can include database (DB) subnet(s) 530 (e.g. similar to DB subnet(s) 430 of FIG. 4). The LB subnet(s) 522 contained in the control plane DMZ tier 520 can be communicatively coupled to the app subnet(s) 526 contained in the control plane app tier 524 and an Internet gateway 534 (e.g. the Internet gateway 434 of FIG. 4) that can be contained in the control plane VCN 516, and the app subnet(s) 526 can be communicatively coupled to the DB subnet(s) 530 contained in the control plane data tier 528 and a service gateway 536 (e.g. the service gateway of FIG. 4) and a network address translation (NAT) gateway 538 (e.g. the NAT gateway 438 of FIG. 4). The control plane VCN 516 can include the service gateway 536 and the NAT gateway 538.

The control plane VCN 516 can include a data plane mirror app tier 540 (e.g. the data plane mirror app tier 440 of FIG. 4) that can include app subnet(s) 526. The app subnet(s) 526 contained in the data plane mirror app tier 540 can include a virtual network interface controller (VNIC) 542 (e.g. the VNIC of 442) that can execute a compute instance 544 (e.g. similar to the compute instance 444 of FIG. 4). The compute instance 544 can facilitate communication between the app subnet(s) 526 of the data plane mirror app tier 540 and the app subnet(s) 526 that can be contained in a data plane app tier 546 (e.g. the data plane app tier 446 of FIG. 4) via the VNIC 542 contained in the data plane mirror app tier 540 and the VNIC 542 contained in the data plane app tier 546.

The Internet gateway 534 contained in the control plane VCN 516 can be communicatively coupled to a metadata management service 552 (e.g. the metadata management service 452 of FIG. 4) that can be communicatively coupled to public Internet 554 (e.g. public Internet 454 of FIG. 4). Public Internet 554 can be communicatively coupled to the NAT gateway 538 contained in the control plane VCN 516. The service gateway 536 contained in the control plane VCN 516 can be communicatively couple to cloud services 556 (e.g. cloud services 456 of FIG. 4).

In some examples, the data plane VCN 518 can be contained in the customer tenancy 521. In this case, the IaaS provider may provide the control plane VCN 516 for each customer, and the IaaS provider may, for each customer, set up a unique compute instance 544 that is contained in the service tenancy 519. Each compute instance 544 may allow communication between the control plane VCN 516, contained in the service tenancy 519, and the data plane VCN 518 that is contained in the customer tenancy 521. The compute instance 544 may allow resources, which are provisioned in the control plane VCN 516 that is contained in the service tenancy 519, to be deployed or otherwise used in the data plane VCN 518 that is contained in the customer tenancy 521.

In other examples, the customer of the IaaS provider may have databases that live in the customer tenancy 521. In this example, the control plane VCN 516 can include the data plane mirror app tier 540 that can include app subnet(s) 526. The data plane mirror app tier 540 can reside in the data plane VCN 518, but the data plane mirror app tier 540 may not live in the data plane VCN 518. That is, the data plane mirror app tier 540 may have access to the customer tenancy 521, but the data plane mirror app tier 540 may not exist in the data plane VCN 518 or be owned or operated by the customer of the IaaS provider. The data plane mirror app tier 540 may be configured to make calls to the data plane VCN 518 but may not be configured to make calls to any entity contained in the control plane VCN 516. The customer may desire to deploy or otherwise use resources in the data plane VCN 518 that are provisioned in the control plane VCN 516, and the data plane mirror app tier 540 can facilitate the desired deployment, or other usage of resources, of the customer.

In some embodiments, the customer of the IaaS provider can apply filters to the data plane VCN 518. In this embodiment, the customer can determine what the data plane VCN 518 can access, and the customer may restrict access to public Internet 554 from the data plane VCN 518. The IaaS provider may not be able to apply filters or otherwise control access of the data plane VCN 518 to any outside networks or databases. Applying filters and controls by the customer onto the data plane VCN 518, contained in the customer tenancy 521, can help isolate the data plane VCN 518 from other customers and from public Internet 554.

In some embodiments, cloud services 556 can be called by the service gateway 536 to access services that may not exist on public Internet 554, on the control plane VCN 516, or on the data plane VCN 518. The connection between cloud services 556 and the control plane VCN 516 or the data plane VCN 518 may not be live or continuous. Cloud services 556 may exist on a different network owned or operated by the IaaS provider. Cloud services 556 may be configured to receive calls from the service gateway 536 and may be configured to not receive calls from public Internet 554. Some cloud services 556 may be isolated from other cloud services 556, and the control plane VCN 516 may be isolated from cloud services 556 that may not be in the same region as the control plane VCN 516. For example, the control plane VCN 516 may be located in "Region 1," and cloud service "Deployment 4," may be located in Region 1 and in "Region 2." If a call to Deployment 4 is made by the service gateway 536 contained in the control plane VCN 516 located in Region 1, the call may be transmitted to Deployment 4 in Region 1. In this example, the control plane VCN 516, or Deployment 4 in Region 1, may not be communicatively coupled to, or otherwise in communication with, Deployment 4 in Region 2.

Figure 6:
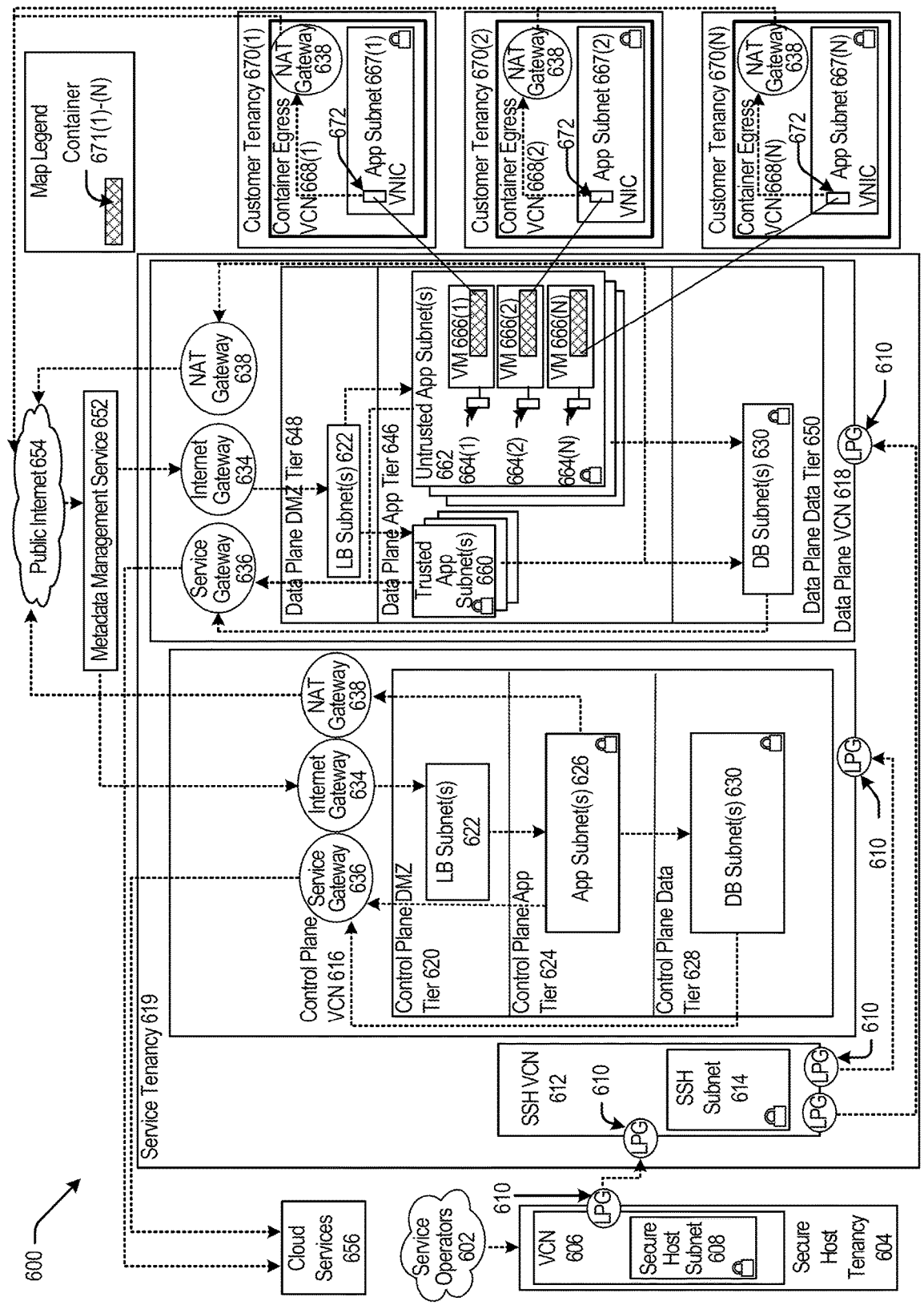
FIG. 6 is a block diagram illustrating another pattern for implementing a cloud infrastructure as a service system, according to at least one embodiment.

FIG. 6 is a block diagram 600 illustrating another example pattern of an IaaS architecture, according to at least one embodiment. Service operators 602 (e.g. service operators 402 of FIG. 4) can be communicatively coupled to a secure host tenancy 604 (e.g. the secure host tenancy 404 of FIG. 4) that can include a virtual cloud network (VCN) 606 (e.g. the VCN 406 of FIG. 4) and a secure host subnet 608 (e.g. the secure host subnet 408 of FIG. 4). The VCN 606 can include an LPG 610 (e.g. the LPG 410 of FIG. 4) that can be communicatively coupled to an SSH VCN 612 (e.g. the SSH VCN 412 of FIG. 4) via an LPG 610 contained in the SSH VCN 612. The SSH VCN 612 can include an SSH subnet 614 (e.g. the SSH subnet 414 of FIG. 4), and the SSH VCN 612 can be communicatively coupled to a control plane VCN 616 (e.g. the control plane VCN 416 of FIG. 4) via an LPG 610 contained in the control plane VCN 616 and to a data plane VCN 618 (e.g. the data plane 418 of FIG. 4) via an LPG 610 contained in the data plane VCN 618. The control plane VCN 616 and the data plane VCN 618 can be contained in a service tenancy 619 (e.g. the service tenancy 419 of FIG. 4).

The control plane VCN 616 can include a control plane DMZ tier 620 (e.g. the control plane DMZ tier 420 of FIG. 4) that can include load balancer (LB) subnet(s) 622 (e.g. LB subnet(s) 422 of FIG. 4), a control plane app tier 624 (e.g. the control plane app tier 424 of FIG. 4) that can include app subnet(s) 626 (e.g. similar to app subnet(s) 426 of FIG. 4), a control plane data tier 628 (e.g. the control plane data tier 428 of FIG. 4) that can include DB subnet(s) 630. The LB subnet(s) 622 contained in the control plane DMZ tier 620 can be communicatively coupled to the app subnet(s) 626 contained in the control plane app tier 624 and to an Internet gateway 634 (e.g. the Internet gateway 434 of FIG. 4) that can be contained in the control plane VCN 616, and the app subnet(s) 626 can be communicatively coupled to the DB subnet(s) 630 contained in the control plane data tier 628 and to a service gateway 636 (e.g. the service gateway of FIG. 4) and a network address translation (NAT) gateway 638 (e.g. the NAT gateway 438 of FIG. 4). The control plane VCN 616 can include the service gateway 636 and the NAT gateway 638.

The data plane VCN 618 can include a data plane app tier 646 (e.g. the data plane app tier 446 of FIG. 4), a data plane DMZ tier 648 (e.g. the data plane DMZ tier 448 of FIG. 4), and a data plane data tier 650 (e.g. the data plane data tier 450 of FIG. 4). The data plane DMZ tier 648 can include LB subnet(s) 622 that can be communicatively coupled to trusted app subnet(s) 660 and untrusted app subnet(s) 662 of the data plane app tier 646 and the Internet gateway 634 contained in the data plane VCN 618. The trusted app subnet(s) 660 can be communicatively coupled to the service gateway 636 contained in the data plane VCN 618, the NAT gateway 638 contained in the data plane VCN 618, and DB subnet(s) 630 contained in the data plane data tier 650. The untrusted app subnet(s) 662 can be communicatively coupled to the service gateway 636 contained in the data plane VCN 618 and DB subnet(s) 630 contained in the data plane data tier 650. The data plane data tier 650 can include DB subnet(s) 630 that can be communicatively coupled to the service gateway 636 contained in the data plane VCN 618.

The untrusted app subnet(s) 662 can include one or more primary VNICs 664(1)-(N) that can be communicatively coupled to tenant virtual machines (VMs) 666(1)-(N). Each tenant VM 666(1)-(N) can be communicatively coupled to a respective app subnet 667(1)-(N) that can be contained in respective container egress VCNs 668(1)-(N) that can be contained in respective customer tenancies 670(1)-(N). Respective secondary VNICs 672(1)-(N) can facilitate communication between the untrusted app subnet(s) 662 contained in the data plane VCN 618 and the app subnet contained in the container egress VCNs 668(1)-(N). Each container egress VCNs 668(1)-(N) can include a NAT gateway 638 that can be communicatively coupled to public Internet 654 (e.g. public Internet 454 of FIG. 4).

The Internet gateway 634 contained in the control plane VCN 616 and contained in the data plane VCN 618 can be communicatively coupled to a metadata management service 652 (e.g. the metadata management system 452 of FIG. 4) that can be communicatively coupled to public Internet 654. Public Internet 654 can be communicatively coupled to the NAT gateway 638 contained in the control plane VCN 616 and contained in the data plane VCN 618. The service gateway 636 contained in the control plane VCN 616 and contained in the data plane VCN 618 can be communicatively couple to cloud services 656.

In some embodiments, the data plane VCN 618 can be integrated with customer tenancies 670. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 646. Code to run the function may be executed in the VMs 666(1)-(N), and the code may not be configured to run anywhere else on the data plane VCN 618. Each VM 666(1)-(N) may be connected to one customer tenancy 670. Respective containers 671(1)-(N) contained in the VMs 666(1)-(N) may be configured to run the code. In this case, there can be a dual isolation (e.g., the containers 671(1)-(N) running code, where the containers 671(1)-(N) may be contained in at least the VM 666(1)-(N) that are contained in the untrusted app subnet(s) 662), which may help prevent incorrect or otherwise undesirable code from damaging the network of the IaaS provider or from damaging a network of a different customer. The containers 671(1)-(N) may be communicatively coupled to the customer tenancy 670 and may be configured to transmit or receive data from the customer tenancy 670. The containers 671(1)-(N) may not be configured to transmit or receive data from any other entity in the data plane VCN 618. Upon completion of running the code, the IaaS provider may kill or otherwise dispose of the containers 671(1)-(N).

In some embodiments, the trusted app subnet(s) 660 may run code that may be owned or operated by the IaaS provider. In this embodiment, the trusted app subnet(s) 660 may be communicatively coupled to the DB subnet(s) 630 and be configured to execute CRUD operations in the DB subnet(s) 630. The untrusted app subnet(s) 662 may be communicatively coupled to the DB subnet(s) 630, but in this embodiment, the untrusted app subnet(s) may be configured to execute read operations in the DB subnet(s) 630. The containers 671(1)-(N) that can be contained in the VM 666(1)-(N) of each customer and that may run code from the customer may not be communicatively coupled with the DB subnet(s) 630.

In other embodiments, the control plane VCN 616 and the data plane VCN 618 may not be directly communicatively coupled. In this embodiment, there may be no direct communication between the control plane VCN 616 and the data plane VCN 618. However, communication can occur indirectly through at least one method. An LPG 610 may be established by the IaaS provider that can facilitate communication between the control plane VCN 616 and the data plane VCN 618. In another example, the control plane VCN 616 or the data plane VCN 618 can make a call to cloud services 656 via the service gateway 636. For example, a call to cloud services 656 from the control plane VCN 616 can include a request for a service that can communicate with the data plane VCN 618.

Figure 7:
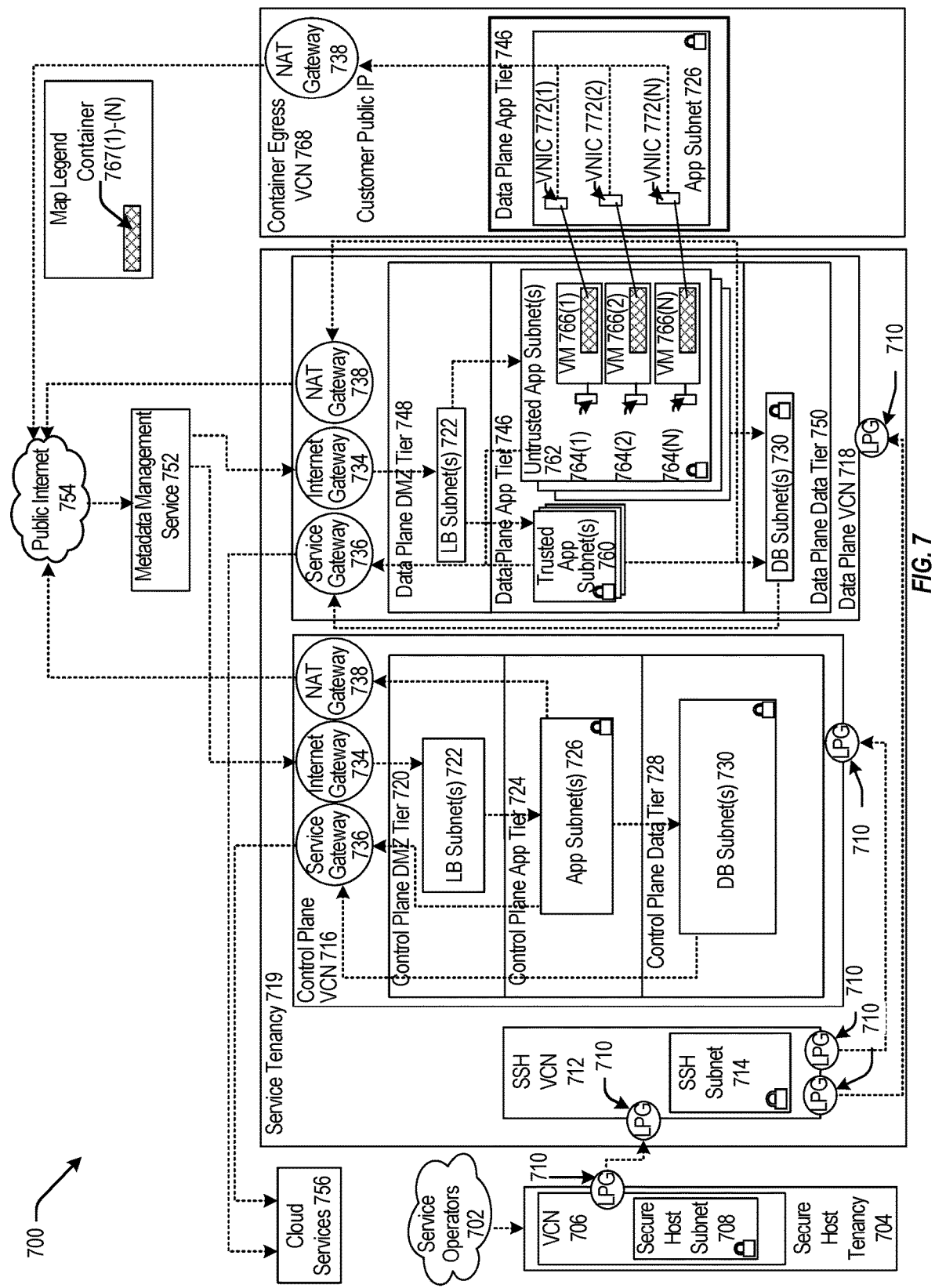
FIG. 7 is a block diagram illustrating another pattern for implementing a cloud infrastructure as a service system, according to at least one embodiment.

FIG. 7 is a block diagram 700 illustrating another example pattern of an IaaS architecture, according to at least one embodiment. Service operators 702 (e.g. service operators 402 of FIG. 4) can be communicatively coupled to a secure host tenancy 704 (e.g. the secure host tenancy 404 of FIG. 4) that can include a virtual cloud network (VCN) 706 (e.g. the VCN 406 of FIG. 4) and a secure host subnet 708 (e.g. the secure host subnet 408 of FIG. 4). The VCN 706 can include an LPG 710 (e.g. the LPG 410 of FIG. 4) that can be communicatively coupled to an SSH VCN 712 (e.g. the SSH VCN 412 of FIG. 4) via an LPG 710 contained in the SSH VCN 712. The SSH VCN 712 can include an SSH subnet 714 (e.g. the SSH subnet 414 of FIG. 4), and the SSH VCN 712 can be communicatively coupled to a control plane VCN 716 (e.g. the control plane VCN 416 of FIG. 4) via an LPG 710 contained in the control plane VCN 716 and to a data plane VCN 718 (e.g. the data plane 418 of FIG. 4) via an LPG 710 contained in the data plane VCN 718. The control plane VCN 716 and the data plane VCN 718 can be contained in a service tenancy 719 (e.g. the service tenancy 419 of FIG. 4).

The control plane VCN 716 can include a control plane DMZ tier 720 (e.g. the control plane DMZ tier 420 of FIG. 4) that can include LB subnet(s) 722 (e.g. LB subnet(s) 422 of FIG. 4), a control plane app tier 724 (e.g. the control plane app tier 424 of FIG. 4) that can include app subnet(s) 726 (e.g. app subnet(s) 426 of FIG. 4), a control plane data tier 728 (e.g. the control plane data tier 428 of FIG. 4) that can include DB subnet(s) 730 (e.g. DB subnet(s) 630 of FIG. 6). The LB subnet(s) 722 contained in the control plane DMZ tier 720 can be communicatively coupled to the app subnet(s) 726 contained in the control plane app tier 724 and to an Internet gateway 734 (e.g. the Internet gateway 434 of FIG. 4) that can be contained in the control plane VCN 716, and the app subnet(s) 726 can be communicatively coupled to the DB subnet(s) 730 contained in the control plane data tier 728 and to a service gateway 736 (e.g. the service gateway of FIG. 4) and a network address translation (NAT) gateway 738 (e.g. the NAT gateway 438 of FIG. 4). The control plane VCN 716 can include the service gateway 736 and the NAT gateway 738.

The data plane VCN 718 can include a data plane app tier 746 (e.g. the data plane app tier 446 of FIG. 4), a data plane DMZ tier 748 (e.g. the data plane DMZ tier 448 of FIG. 4), and a data plane data tier 750 (e.g. the data plane data tier 450 of FIG. 4). The data plane DMZ tier 748 can include LB subnet(s) 722 that can be communicatively coupled to trusted app subnet(s) 760 (e.g. trusted app subnet(s) 660 of FIG. 6) and untrusted app subnet(s) 762 (e.g. untrusted app subnet(s) 662 of FIG. 6) of the data plane app tier 746 and the Internet gateway 734 contained in the data plane VCN 718. The trusted app subnet(s) 760 can be communicatively coupled to the service gateway 736 contained in the data plane VCN 718, the NAT gateway 738 contained in the data plane VCN 718, and DB subnet(s) 730 contained in the data plane data tier 750. The untrusted app subnet(s) 762 can be communicatively coupled to the service gateway 736 contained in the data plane VCN 718 and DB subnet(s) 730 contained in the data plane data tier 750. The data plane data tier 750 can include DB subnet(s) 730 that can be communicatively coupled to the service gateway 736 contained in the data plane VCN 718.

The untrusted app subnet(s) 762 can include primary VNICs 764(1)-(N) that can be communicatively coupled to tenant virtual machines (VMs) 766(1)-(N) residing within the untrusted app subnet(s) 762. Each tenant VM 766(1)-(N) can run code in a respective container 767(1)-(N), and be communicatively coupled to an app subnet 726 that can be contained in a data plane app tier 746 that can be contained in a container egress VCN 768. Respective secondary VNICs 772(1)-(N) can facilitate communication between the untrusted app subnet(s) 762 contained in the data plane VCN 718 and the app subnet contained in the container egress VCN 768. The container egress VCN can include a NAT gateway 738 that can be communicatively coupled to public Internet 754 (e.g. public Internet 454 of FIG. 4).

The Internet gateway 734 contained in the control plane VCN 716 and contained in the data plane VCN 718 can be communicatively coupled to a metadata management service 752 (e.g. the metadata management system 452 of FIG. 4) that can be communicatively coupled to public Internet 754. Public Internet 754 can be communicatively coupled to the NAT gateway 738 contained in the control plane VCN 716 and contained in the data plane VCN 718. The service gateway 736 contained in the control plane VCN 716 and contained in the data plane VCN 718 can be communicatively couple to cloud services 756.

In some examples, the pattern illustrated by the architecture of block diagram 700 of FIG. 7 may be considered an exception to the pattern illustrated by the architecture of block diagram 600 of FIG. 6 and may be desirable for a customer of the IaaS provider if the IaaS provider cannot directly communicate with the customer (e.g., a disconnected region). The respective containers 767(1)-(N) that are contained in the VMs 766(1)-(N) for each customer can be accessed in real-time by the customer. The containers 767(1)-(N) may be configured to make calls to respective secondary VNICs 772(1)-(N) contained in app subnet(s) 726 of the data plane app tier 746 that can be contained in the container egress VCN 768. The secondary VNICs 772(1)-(N) can transmit the calls to the NAT gateway 738 that may transmit the calls to public Internet 754. In this example, the containers 767(1)-(N) that can be accessed in real-time by the customer can be isolated from the control plane VCN 716 and can be isolated from other entities contained in the data plane VCN 718. The containers 767(1)-(N) may also be isolated from resources from other customers.

In other examples, the customer can use the containers 767(1)-(N) to call cloud services 756. In this example, the customer may run code in the containers 767(1)-(N) that requests a service from cloud services 756. The containers 767(1)-(N) can transmit this request to the secondary VNICs 772(1)-(N) that can transmit the request to the NAT gateway that can transmit the request to public Internet 754. Public Internet 754 can transmit the request to LB subnet(s) 722 contained in the control plane VCN 716 via the Internet gateway 734. In response to determining the request is valid, the LB subnet(s) can transmit the request to app subnet(s) 726 that can transmit the request to cloud services 756 via the service gateway 736.

It should be appreciated that IaaS architectures 400, 500, 600, 700 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 8:
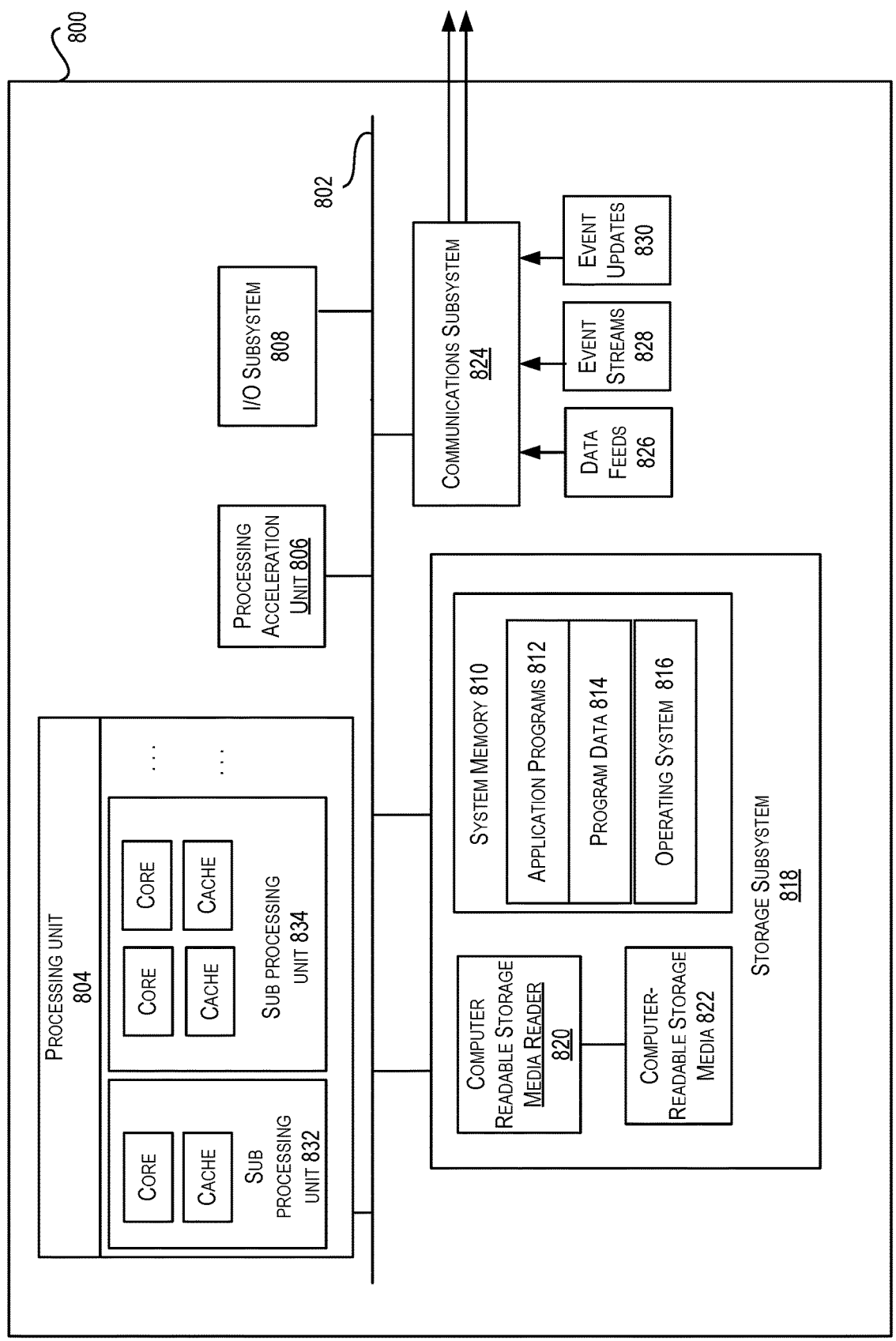
FIG. 8 is a block diagram illustrating an example computer system, according to at least one embodiment.

FIG. 8 illustrates an example computer system 800, in which various embodiments may be implemented. The system 800 may be used to implement any of the computer systems described above. As shown in the figure, computer system 800 includes a processing unit 804 that communicates with a number of peripheral subsystems via a bus subsystem 802. These peripheral subsystems may include a processing acceleration unit 806, an input/output (I/O) subsystem 808, a storage subsystem 818 and a communications subsystem 824. Storage subsystem 818 includes tangible computer-readable storage media 822 and a system memory 810.

Bus subsystem 802 provides a mechanism for letting the various components and subsystems of computer system 800 communicate with each other as intended. Although bus subsystem 802 is shown schematically as a single bus, alternative embodiments of the bus subsystem may utilize multiple buses. Bus subsystem 802 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the Institute of Electrical and Electronics Engineers (IEEE) P1386.1 standard.

Processing unit 804, which can be implemented as one or more integrated circuits (e.g., a conventional microprocessor or microcontroller), controls the operation of computer system 800. One or more processors may be included in processing unit 804. These processors may include single core or multicore processors. In certain embodiments, processing unit 804 may be implemented as one or more independent processing units 832 and/or 834 with single or multicore processors included in each processing unit. In other embodiments, processing unit 804 may also be implemented as a quad-core processing unit formed by integrating two dual-core processors into a single chip.

In various embodiments, processing unit 804 can execute a variety of programs in response to program code and can maintain multiple concurrently executing programs or processes. At any given time, some or all of the program code to be executed can be resident in processor(s) 804 and/or in storage subsystem 818. Through suitable programming, processor(s) 804 can provide various functionalities described above. Computer system 800 may additionally include a processing acceleration unit 806, which can include a digital signal processor (DSP), a special-purpose processor, and/or the like.

I/O subsystem 808 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 800 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 800 may comprise a storage subsystem 818 that comprises software elements, shown as being currently located within a system memory 810. System memory 810 may store program instructions that are loadable and executable on processing unit 804, as well as data generated during the execution of these programs.

Depending on the configuration and type of computer system 800, system memory 810 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 804. In some implementations, system memory 810 may include multiple different types of memory, such as static random access memory (SRAM) or dynamic random access memory (DRAM). In some implementations, a basic input/output system (BIOS), containing the basic routines that help to transfer information between elements within computer system 800, such as during start-up, may typically be stored in the ROM. By way of example, and not limitation, system memory 810 also illustrates application programs 812, which may include client applications, Web browsers, mid-tier applications, relational database management systems (RDBMS), etc., program data 814, and an operating system 816. By way of example, operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 8 OS, and Palm® OS operating systems.

Storage subsystem 818 may also provide a tangible computer-readable storage medium for storing the basic programming and data constructs that provide the functionality of some embodiments. Software (programs, code modules, instructions) that when executed by a processor provide the functionality described above may be stored in storage subsystem 818. These software modules or instructions may be executed by processing unit 804. Storage subsystem 818 may also provide a repository for storing data used in accordance with the present disclosure.

Storage subsystem 818 may also include a computer-readable storage media reader 820 that can further be connected to computer-readable storage media 822. Together and, optionally, in combination with system memory 810, computer-readable storage media 822 may comprehensively represent remote, local, fixed, and/or removable storage devices plus storage media for temporarily and/or more permanently containing, storing, transmitting, and retrieving computer-readable information.

Computer-readable storage media 822 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, compact disc read-only memory (CD-ROM), digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 800.

By way of example, computer-readable storage media 822 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 800.

Communications subsystem 824 provides an interface to other computer systems and networks. Communications subsystem 824 serves as an interface for receiving data from and transmitting data to other systems from computer system 800. For example, communications subsystem 824 may enable computer system 800 to connect to one or more devices via the Internet. In some embodiments communications subsystem 824 can include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 802.11 family standards, or other mobile communication technologies, or any combination thereof), global positioning system (GPS) receiver components, and/or other components. In some embodiments communications subsystem 824 can provide wired network connectivity (e.g., Ethernet) in addition to or instead of a wireless interface.

In some embodiments, communications subsystem 824 may also receive input communication in the form of structured and/or unstructured data feeds 826, event streams 828, event updates 830, and the like on behalf of one or more users who may use computer system 800.

By way of example, communications subsystem 824 may be configured to receive data feeds 826 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 824 may also be configured to receive data in the form of continuous data streams, which may include event streams 828 of real-time events and/or event updates 830, which may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 824 may also be configured to output the structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 800 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments.

Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
  receiving a request to extend a tenancy for cloud services in a home region for a customer to an extended region for the customer, wherein extending the tenancy replicates data records for the tenancy such that they exist in both the home region and the extended region of the tenancy, wherein the extended region is geographically different from the home region;
  identifying the data records associated with the tenancy to be extended to the extended region;
  in addition to an existing channel between the home region of the tenancy for cloud services and the extended region of the tenancy, establishing a dedicated channel for communicating data records that exceed a predetermined threshold to the extended region, the data records associated with the tenancy between a first server in the home region of the tenancy and a second server in the extended region of the tenancy, wherein the dedicated channel is separate from the existing channel between the home region and the extended region and enables communicating the data records to the extended region via the dedicated channel to minimize communications impact on the existing channel;
  communicating, via the dedicated channel to the extended region, the identified data records from the first server in the home region to the second server in the extended region; and
  closing the dedicated channel upon completion of communicating the identified data records to the extended region.

2. The method of claim 1, further comprising:
determining a size of the identified data records; and
based in part on the size of the identified data records, selecting a secondary communication channel between the first server in the home region and the second server in the extended region, wherein the secondary communication channel is dedicated to replicating the identified data records from the first server in the home region to the second server in the extended region.

3. The method of claim 2, wherein determining the size of the identified data records comprises determining a number of records associated with the tenancy.

4. The method of claim 2, wherein determining the size of the identified data records comprises determine a number of bits of the identified data records associated with the tenancy.

5. The method of claim 2, further comprising establishing the secondary communication channel, wherein the establishing comprises:
establishing a memory space for the identified data records; and
writing the identified data records to the memory space.

6. The method of claim 1, further comprising communicating updates for one or more existing tenancy records over a primary communication channel.

7. The method of claim 1, wherein the communicating comprises pulling the identified data records from the first server in the home region to the second server in the extended region via the dedicated channel.

8. The method of claim 1, wherein the communicating comprises pushing the identified data records from the first server in the home region to the second server in the extended region via the dedicated channel.

9. A method performed by a processor of a server of an extended region, the method comprising:
receiving a request to extend a tenancy from a home region for a customer, wherein extending the tenancy replicates data records for the tenancy such that the data records exist in both the home region and the extended region of the tenancy;
communicating the request to the home region via a dedicated communication channel for the extended region, wherein the dedicated communication channel is separate from an existing channel between the home region and the extended region and enables communicating the data records to the extended region associated with the tenancy, wherein the data records communicated to the extended region exceed a predetermined threshold;
based in part on a number of data records associated with the tenancy in the home region, receiving replicated data records for the tenancy over the dedicated communication channel to minimize communications impact on the existing channel;
processing the replicated data records; and
backfilling the replicated data records.

10. The method of claim 9, further comprising establishing the dedicated communication channel, wherein the establishing comprises:
establishing a memory space for the replicated data records; and
writing the replicated data records to the memory space.

11. The method of claim 9, further comprising receiving updates to one or more records for existing tenancies over a primary communication channel.

12. The method of claim 11, further comprising:
storing the replicated data records and the updates to the one or more records in a sequential order, wherein the storing the updates is paused until prior sequentially numbered replicated data records are stored.

13. The method of claim 9, wherein the receiving comprises pulling the replicated data records from a first server in the home region via the dedicated communication channel.

14. A non-transitory computer-readable medium storing instructions, the instructions comprising:
one or more instructions that, when executed by one or more processors, cause the one or more processors to:
receive a request to extend a tenancy for cloud services in a home region for a customer to an extended region for the customer, wherein extending the tenancy replicates data records for the tenancy such that the data records exist in both the home region and the extended region of the tenancy, wherein the extended region is geographically different from the home region;
identify stored data records associated with the tenancy to be extended to the extended region;
in addition to an existing channel between the home region of the tenancy for the cloud services and the extended region of the tenancy, establishing a dedicated channel for communicating data records that exceed a predetermined threshold to the extended region, the data records associated with the tenancy between a first server in the home region of the tenancy and a second server in the extended region of the tenancy, wherein the dedicated channel is separate from the existing channel between the home region and the extended region and enables communicating the data records to the extended region via the dedicated channel to minimize communications impact on the existing channel;
communicate, via the dedicated channel to the extended region, the identified data records from the first server in the home region to the second server in the extended region; and
closing the dedicated channel upon completion of communicating the identified data records to the extended region.

15. The non-transitory computer-readable medium of claim 14, further comprising one or more instructions that cause the one or more processors to:
determining a size of the identified data records; and
based in part on the size of the stored data records, selecting a secondary communication channel between the first server in the home region and the second server in the extended region, wherein the dedicated channel is dedicated to replicating the stored data records from the first server in the home region to the second server in the extended region.

16. The non-transitory computer-readable medium of claim 15, wherein determining the size of the stored data records comprises determining a number of records associated with the tenancy.

17. The non-transitory computer-readable medium of claim 15, wherein determining the size of the stored data records comprises determining a number of bits of the stored data records associated with the tenancy.

18. The non-transitory computer-readable medium of claim 14, further comprising one or more instructions for establishing the dedicated channel, the one or more instructions cause the one or more processors to:

establish a memory space for the identified data records; and write the identified data records to the memory space.

19. The non-transitory computer-readable medium of claim 14, further comprising communicating updates for one or more existing tenancy records over a primary communication channel.

20. The non-transitory computer-readable medium of claim 19, wherein the updates to the one or more existing tenancy records are communicated in a sequential order.

* * * * *